Dec. 14, 1943.  J. E. CRUSE  2,336,848
HYDRAULIC DISK FRAME
Filed July 8, 1942   3 Sheets-Sheet 2
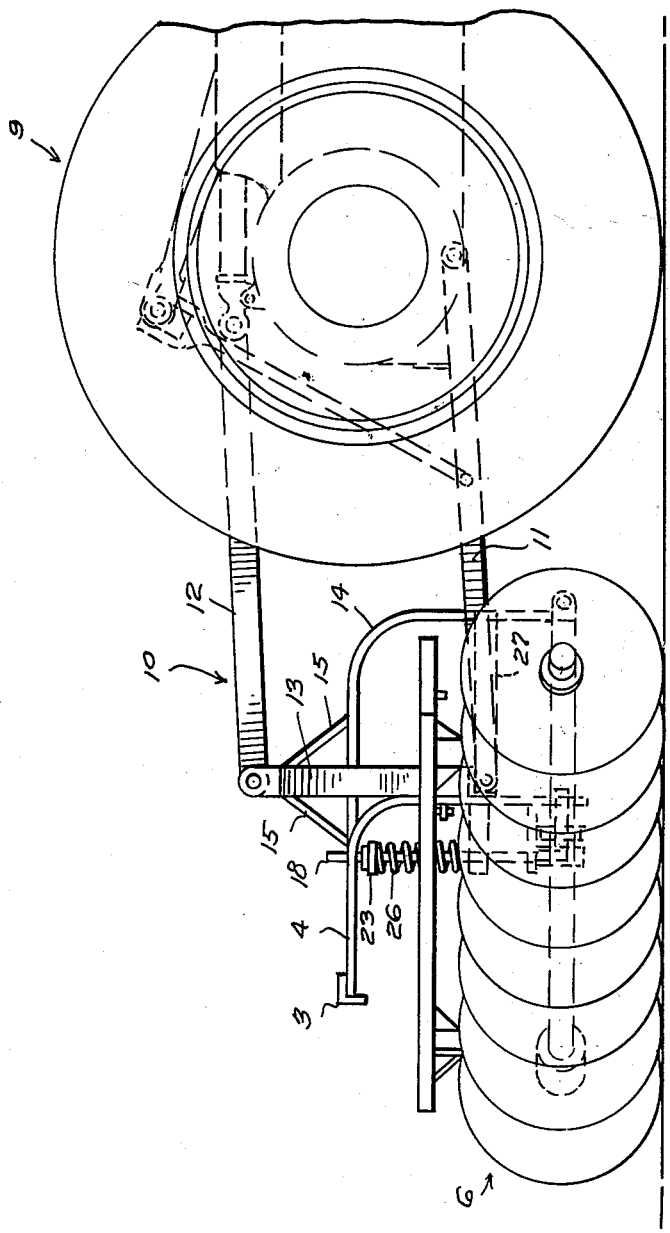
Inventor
Joseph E. Cruse
By Clarence A. O'Brien
and Harvey B. Jackson Attorneys

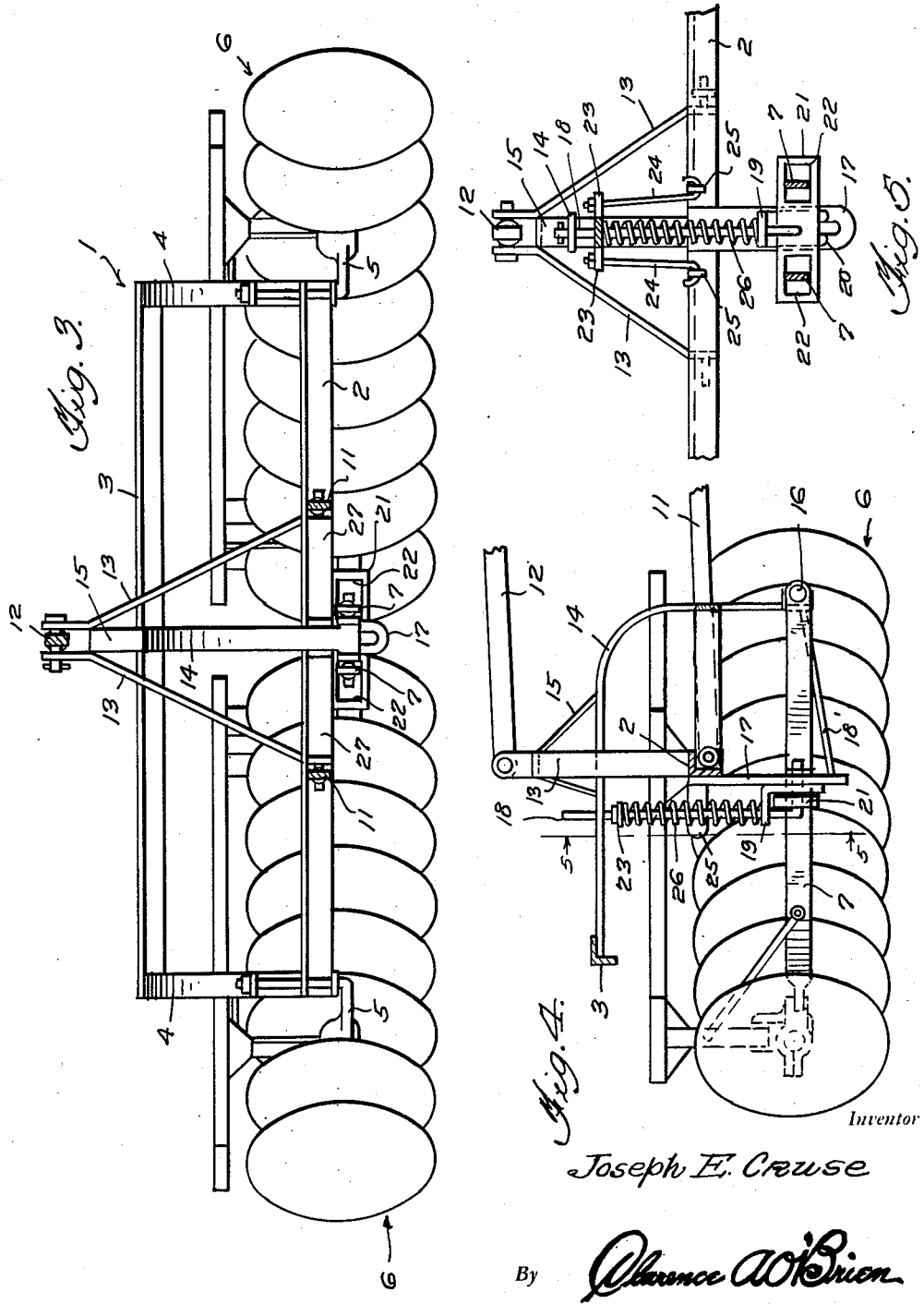

Patented Dec. 14, 1943

2,336,848

UNITED STATES PATENT OFFICE 2,336,848

HYDRAULIC DISK FRAME

Joseph E. Cruse, Greeley, Nebr.

Application July 8, 1942, Serial No. 450,213

1 Claim. (Cl. 55—81)

The present invention relates to new and useful improvements in agricultural implements in general and particularly to hydraulic disk frames for use in conjunction with the "Ferguson" linkage system on "Ford" tractors.

An important object of the present invention is to provide a frame of the aforementioned character comprising a novel construction and arrangement whereby the disks may be operated at such an angle as to have a continuous suction in the soil, also to scour better in different kinds of soil and, still further to turn said soil over in a manner substantially similar to a disk plow. Another very important object of the invention is to provide a hydraulic disk frame of the character described which, with the disk gangs thereon may be lifted clear of the ground and transported on the tractor through the medium of the linkage system.

Still another very important object of the invention is to provide a hydraulic disk frame of the character set forth which, as a result of the manner in which it is connected to the "Ferguson" linkage system, may be conveniently adjusted horizontally and vertically.

A still further important object of the invention is to provide a hydraulic disk frame of the character described comprising resilient means of a novel construction for holding the inner ends of the disk gangs at the desired depth, whereby flexibility of said disk gangs will be had.

Other objects of the invention are to provide a hydraulic disk frame which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts through the several views, and wherein—

Figure 2 is a view in side elevation thereof.

Figure 3 is a view in front elevation showing the compression and tension links of the "Ferguson" system in cross-section.

Figure 4 is a view in vertical longitudinal section through an intermediate portion of the device.

Figure 5 is a cross-sectional view through an intermediate portion of the device taken substantially on the line 5—5 of Figure 4.

Figure 1:
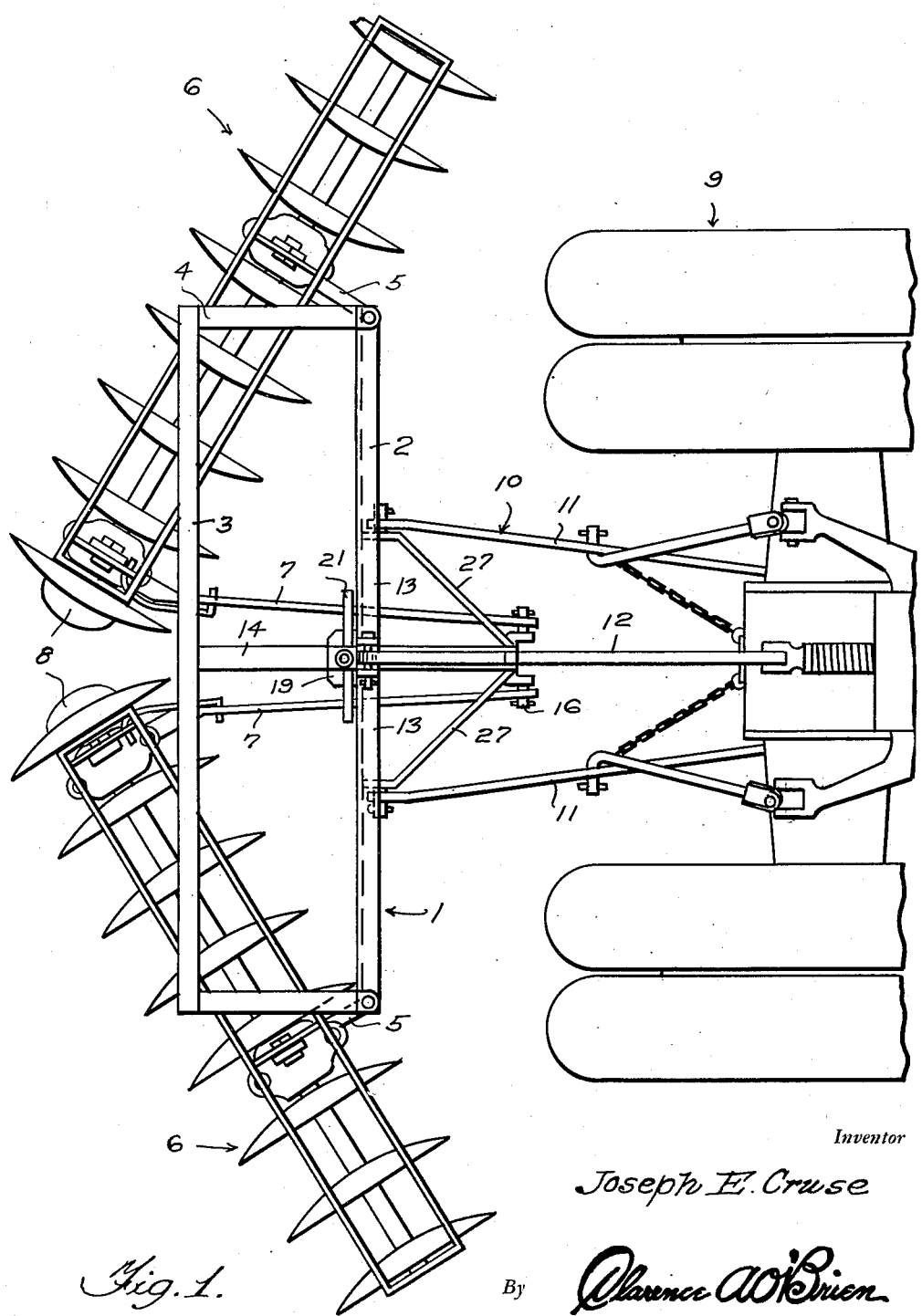
Figure 1 is a top plan view of a hydraulic disk frame constructed in accordance with the present invention, showing the device connected to a tractor.

Referring now to the drawings in detail, it will be seen that the embodiment of the invention which has been illustrated comprises a transversely elongated, welded frame of suitable metal, which is designated generally by reference numeral 1. The frame 1 includes a front bar 2, a relatively elevated rear bar 3 and angular side bars 4 extending between the end portions of said bars 2 and 3.

Drawbars 5 are journaled on the front of the frame 1 at the ends thereof, for swinging movement in a horizontal plane. Gangs 6 of rearwardly converging disks are connected, at intermediate points, to the outer drawbars 5. Drawbars 7 are connected to the inner ends of the disk gangs 6. Bumpers 8 are provided on the inner ends of the disk gangs 6.

A "Ferguson" linkage system on the rear end of a "Ford" tractor 9 is indicated at 10. The system 10 includes the usual tension links 11 which are connected to the bar 2 of the frame 1, and a compression link 12. The compression link 12 is connected to a pair of upwardly converging bars 13 which rise from the bar 2 of the frame 1.

An angular beam 14 is suspended, at an intermediate point, from the upper portions of the bars 13 by members 15. The rear end of the beam 14 is secured to the bar 3. The forward portion of the beam 14 extends downwardly and the forward end portions of the drawbars 7 are pivotally connected thereto at 16.

Depending from the bar 2 at an intermediate point is a vertically slotted guide 17. A brace 18' extends between the lower portion of the guide 17 and the forward end portion of the beam 14. A substantially L-shaped, vertically slidable rod 18 has its lower end portion operable in the guide 17. Slidably mounted on the lower portion of the rod 18 is an angular bracket 19, said bracket including a bifurcated vertical leg 20 which straddles the horizontal lower end portion of said rod 18. Mounted transversely on the horizontal lower portion of the rod 18, between the vertical leg 20 of the bracket 19 and the vertical portion of said rod 18, is a bar 21 having elongated openings 22 therein which accommodate the drawbars 7.

The upper end portion of the rod 18 extends slidably through the beam 14. Slidably mounted on the upper portion of the rod 18, below the beam 14, is a crosshead 23. A pair of J-bolts 24 adjustably anchor the crosshead 23 to apertured ears 25 which project rearwardly from the bar 2. A coil spring 26 is mounted under compression on the rod 18 between the crosshead 23 and the bracket 19. Braces 27 extend from the bar 2 to the front portion of the beam 14.

The construction and arrangement is such as to permit maximum flexibility and adjustability of the gang disks 6. The drawbars 7, which carry the inner ends of the rearwardly converging gang disks 6, are yieldingly urged downwardly by the coil spring 26. The tension of this coil spring 26 may be conveniently adjusted or regulated as desired through the medium of the J-bolts 24. The linkage system 10 is adapted to readily lift the entire structure, with the gang disks 6 thereon, clear of the ground to be transported on the tractor 9.

It is believed that the many advantages of a hydraulic disk frame constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

An agricultural device of the character described comprising a transversely elongated frame including a front bar connected to the tension links of a system of implement control, of the type including a compression link, on a tractor, means connecting said front bar to the compression link of the system, a beam mounted longitudinally on the frame and including a downturned forward end portion, a pair of drawbars loosely connected to the forward end portion of said beam for lateral and vertical swinging movement, a pair of drawbars journaled on the end portions of the frame for swinging movement in a horizontal plane, said drawbars for connection with rearwardly converging gangs of disks, means for yieldingly urging the first-named drawbars downwardly, and means for limiting the lateral swinging movement of said first-named drawbars.

JOSEPH E. CRUSE.